(12) United States Patent
Lucet et al.

(10) Patent No.: US 11,254,330 B2
(45) Date of Patent: Feb. 22, 2022

(54) METHOD FOR AUTOMATICALLY DRIVING A VEHICLE UNDER CONSTRAINT, IN PARTICULAR A BUS IN A STORAGE FACILITY, AND DEVICE IMPLEMENTING SUCH A METHOD

(71) Applicant: COMMISSARIAT A L'ENERGIE ATOMIQUE ET AUX ENERGIES ALTERNATIVES, Paris (FR)

(72) Inventors: Eric Lucet, Paris (FR); Alain Micaelli, Fontenay-aux-Roses (FR); François-Xavier Russotto, Meudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 129 days.

(21) Appl. No.: 16/755,150

(22) PCT Filed: Aug. 27, 2018

(86) PCT No.: PCT/EP2018/072949
§ 371 (c)(1),
(2) Date: Apr. 9, 2020

(87) PCT Pub. No.: WO2019/072449
PCT Pub. Date: Apr. 18, 2019

(65) Prior Publication Data
US 2020/0298878 A1    Sep. 24, 2020

(30) Foreign Application Priority Data

Oct. 10, 2017 (FR) ...................................... 1759456

(51) Int. Cl.
*B60W 60/00* (2020.01)
*B60W 30/02* (2012.01)
*B62D 15/02* (2006.01)

(52) U.S. Cl.
CPC .......... *B60W 60/001* (2020.02); *B60W 30/02* (2013.01); *B62D 15/021* (2013.01);
(Continued)

(58) Field of Classification Search
CPC ............... B60W 60/001; B60W 30/02; B60W 2520/10; B60W 2520/12; B60W 2520/263; B60W 2520/266; B62D 15/021
See application file for complete search history.

(56) References Cited

U.S. PATENT DOCUMENTS 8,170,739 B2 *   5/2012   Lee ........................ G01C 21/00
                                                              701/25
9,933,785 B2     4/2018   Lucet et al.
(Continued)

FOREIGN PATENT DOCUMENTS

CN   106 681 327 A    5/2017
FR   3 038 279 A1     1/2017
WO   2017/077223 A1   5/2017

OTHER PUBLICATIONS

Micaelli et al., "Trajectory tracking for unicycle-type and two-steering-wheels mobile robots", Research Report RR-2097, INRIA, 1993.

*Primary Examiner* — Thomas G Black
*Assistant Examiner* — Brittany Renee Peko
(74) *Attorney, Agent, or Firm* — BakerHostetler

(57) ABSTRACT

A method includes at least the following phases: a first phase wherein a path to be followed is generated, the path being subdivided into a series of sections of which the starting point forms an intermediate position; a second phase wherein, at the current intermediate position of the vehicle: a non-zero curvature is defined for each of the next n prediction horizon sections, the curvature varying progressively from one section to the next; a prediction is made, before the vehicle engages a movement, as to whether the path can be followed to the prediction horizon, as a function of imposed constraints and of the estimated lateral and/or longitudinal slips; a third phase wherein, if the path can be followed, the steering lock angle of the front wheels and the (Continued)

linear traction speed of the vehicle are controlled as a function of the state of the vehicle and of the lateral and/or longitudinal slips to line up the centre of the axle of the rear wheels on the path; if the path cannot be followed, the vehicle is realigned towards the target position and a new reference path is generated according to the first phase.

10 Claims, 3 Drawing Sheets

(52) U.S. Cl.
CPC ..... *B60W 2520/10* (2013.01); *B60W 2520/12* (2013.01); *B60W 2520/263* (2013.01); *B60W 2520/266* (2013.01)

(56) References Cited

U.S. PATENT DOCUMENTS

| | | | |
|---|---|---|---|
| 10,442,465 B2 | 10/2019 | Dhome et al. | |
| 10,684,622 B2 * | 6/2020 | McNeil | G05D 1/0214 |
| 2015/0143913 A1 * | 5/2015 | Adams | G01N 33/227 |
| 2015/0353082 A1 | 12/2015 | Lee et al. | |
| 2020/0247394 A1 * | 8/2020 | Arima | B60W 30/02 |
| 2020/0317194 A1 * | 10/2020 | Yan | B60W 30/12 |

* cited by examiner

METHOD FOR AUTOMATICALLY DRIVING A VEHICLE UNDER CONSTRAINT, IN PARTICULAR A BUS IN A STORAGE FACILITY, AND DEVICE IMPLEMENTING SUCH A METHOD

CROSS-REFERENCE TO RELATED APPLICATIONS

This application is a National Stage of International patent application PCT/EP2018/072949, filed on Aug. 27, 2018, which claims priority to foreign French patent application No. FR 1759456, filed on Oct. 10, 2017, the disclosures of which are incorporated by reference in their entirety.

FIELD OF THE INVENTION

The present invention relates to a method for automatically driving a vehicle under constraint. It relates also to a device implementing such a method. It applies notably for automatically driving buses inside storage centres.

BACKGROUND

The use of buses, for urban public transportation or long journeys is strategic in the current and future transport economy. In this context, one problem to be settled relates to the storage of the buses in a closed centre, this problem being all the more acute since the space allotted is generally limited.

Thus, the storage centres, arranged on several floors, have tight passage zones with restricted parking places. That generates cases of collision of buses with the infrastructure, even collisions between buses. Because of this, the speed in a bus centre is generally limited to 8 km/h. In addition to these accidents, the manoeuvres necessary to the parking of the buses and to the removal of the buses generate losses of time for the drivers taken from their working time.

There is therefore a need to automate the guiding of buses inside a parking structure, at least to make the manoeuvres reliable (avoid the accidents) and to reduce the losses of time in parking.

As an example, such guidance should culminate in the process described briefly hereinbelow.

A bus driver who begins his or her working day presents him or herself at the entrance of the bus centre, and, via a dedicated interface, selects the bus with which he or she wants to work. The bus parked in the bus centre is extracted from its location and follows an itinerary to the exit from the bus centre where it stops at a dedicated location, ready for use. Likewise, at the end of the day, the driver who finishes his or her working day leaves the bus at a location provided at the entrance to the bus centre. Then, the bus automatically follows an itinerary to the parking space which is assigned to it.

To achieve such guidance, it is necessary to overcome several obstacles and notably the accuracy with which paths, which can have tight bends, are followed, notably in a constrained environment such as a bus parking centre for example.

The patent application FR 1501414 discloses a method for automatically driving a vehicle but it is not suited to this type of guidance because it deals with following sections of zero curvature. If this method is used to follow sections of non-zero curvature, that is to say circular arcs, there remains a static lateral error in the following of the path. This method is not therefore suited to guiding buses in a constrained environment as specified previously.

A document by A. Micaelli and C. Samson, "Trajectory tracking for unicycle-type and two-steering-wheels mobile robots" Research Report RR-2097, INRIA, 1993, notably describes a control law for following a non-zero curvature. The solution described in this document is not however suited to the problem of guiding buses in a constrained environment like a parking centre. Indeed, in this case, it is necessary to perform a predictive guidance control that can take account of the control and state constraints with respect to the environment. In particular, it is necessary to guarantee a low deviation of the bus from its reference path over a given prediction horizon, throughout its navigation run. It is also necessary to allow movements at positive and negative speeds, without discontinuity upon transitions between positive and negative speeds via a zero speed.

SUMMARY OF THE INVENTION

One aim of the invention is notably to allow a bus or other vehicle to follow all kinds of paths under constraint, with very good accuracy.

To this end, the subject of the invention is a method for automatically driving a vehicle from a given first point to a given second point forming a target position, said vehicle being subject to lateral and/or longitudinal slips of the front wheels and of the rear wheels in its movements, said method comprising at least the following phases:

a first phase in which a path to be followed is generated as a function of the state of said vehicle and of said target position, said state being defined by the current position and the orientation of said vehicle, said path (33) being subdivided into a series of sections of which the starting point forms an intermediate position;

a second phase in which, at the current intermediate position of said vehicle:
  a curvature is defined for each of the next n sections, said curvature varying from one section to the next according to a polynomial function of the curvature $c_{r_0}$ of the section at said current position and of the curvature $c_{r_{n-1}}$ of the next $n^{th}$ section;
  a prediction is made, before said vehicle engages a movement, as to whether said path can be followed over all of the next n sections, as a function of imposed constraints and of the estimated lateral and/or longitudinal slips;

a third phase in which, if said path can be followed, the steering lock angle of said front wheels and the linear traction speed of said vehicle are controlled as a function of the state of said vehicle and of the lateral and/or longitudinal slips to line up the centre of the axle of said rear wheels on said path;

if the path cannot be followed, said vehicle is realigned towards said target position and a new path to be followed is generated according to the first phase.

In one possible implementation, at each of said intermediate positions comprised between the position of said vehicle and said $n^{th}$ section, the curvature $c_{r_i}$ is defined by:

$$c_{r_i} = \frac{2c_{r_0} + c_{r_{n-1}}}{3},$$

in which $1 \le i \le n-2$.

In another possible implementation, at each of said intermediate positions comprised between the position of said vehicle and said $n^{th}$ section, the curvature $c_{r_i}$ is defined by:

$$c_{r_i} = \frac{2c_{r_{n-1}} + c_{r_0}}{n-1} i + c_{r_0},$$

in which $1 \leq i \leq n-2$.

The law controlling said steering lock angle $\beta_f$ of the front and rear wheels is for example obtained according to a process of optimization of a constrained function in which the variable is a vector u composed of the derivative relative to the distance $\beta''_f$ of said steering lock angle, independently of time.

Advantageously, in a particular implementation, said control law uses a kinematic model of said vehicle defined by the set of the following relationships:

$$\begin{cases} \theta' = \frac{(1+l^2 c_r^2)}{l}(\beta_f - \beta_c) - c_r^2 y \\ y' = \theta \\ y'' = \theta' \\ y''' = \frac{(1+l^2 c_r^2)}{l}\beta'_f - c_r^2 y' \end{cases}$$

in which:
- $(.)'$, $(.)''$, $(.)'''$ respectively express the first, second and third derivatives relative to the curvilinear abscissa;
- $\theta$ is the angular error (rad) which corresponds to the orientation of said vehicle relative to the tangent at the reference point of the path to be followed;
- y is the lateral error which corresponds to the projection of the centre of the rear wheel of said vehicle on the reference point of the path to be followed;
- l is the wheelbase of said vehicle;
- $c_r$ is the curvature of the path to be followed;
- $\beta_f$ is the real steering angle of the front axle of the vehicle, taking into account the slip $\delta_f$;
- $\beta_c$ is the desired steering angle of the front axle of the vehicle to follow a path of curvature $c_r$.

A vector u is for example calculated for each section of said path.

Said constraint is for example a function of said imposed constraints dependent on the bulk of said vehicle.

The state of said vehicle and the slips are for example derived from an observation of independent variables of said path, said variables being:
- the average rotation speeds $\omega_f$ and $\omega_r$ of the front and rear wheels;
- the steering angles of said front and rear wheels $\alpha_f$, $\alpha_r$;
- the derivatives relative to time $\dot{\alpha}_f$, $\dot{\alpha}_r$ of said angles;
- the position $(x_m, y_m)$ and the angle $(\theta_m)$ of a mobile reference frame (m) linked to said vehicle relative to a fixed reference frame (o).

Said vehicle can notably be a public transport bus, said bus being driven automatically inside a bus storage centre.

Also a subject of the invention is a device for the control of the automatic driving of a vehicle from a given first point to a given second point forming a target position, said vehicle being subject to lateral and/or longitudinal slips of the front wheels and of the rear wheels in its movements, characterized in that, said device being able to be embedded in said vehicle and to be linked at least, via appropriate interfaces, to proprioceptive sensors, exteroceptive sensors and motors actuating the steering and the traction of said vehicle, it comprises a computer implementing the method as described previously.

BRIEF DESCRIPTION OF THE DRAWINGS

Other features and advantages of the invention will become apparent from the following description, given in light of the attached drawings which represent.

DETAILED DESCRIPTION

Figure 1:
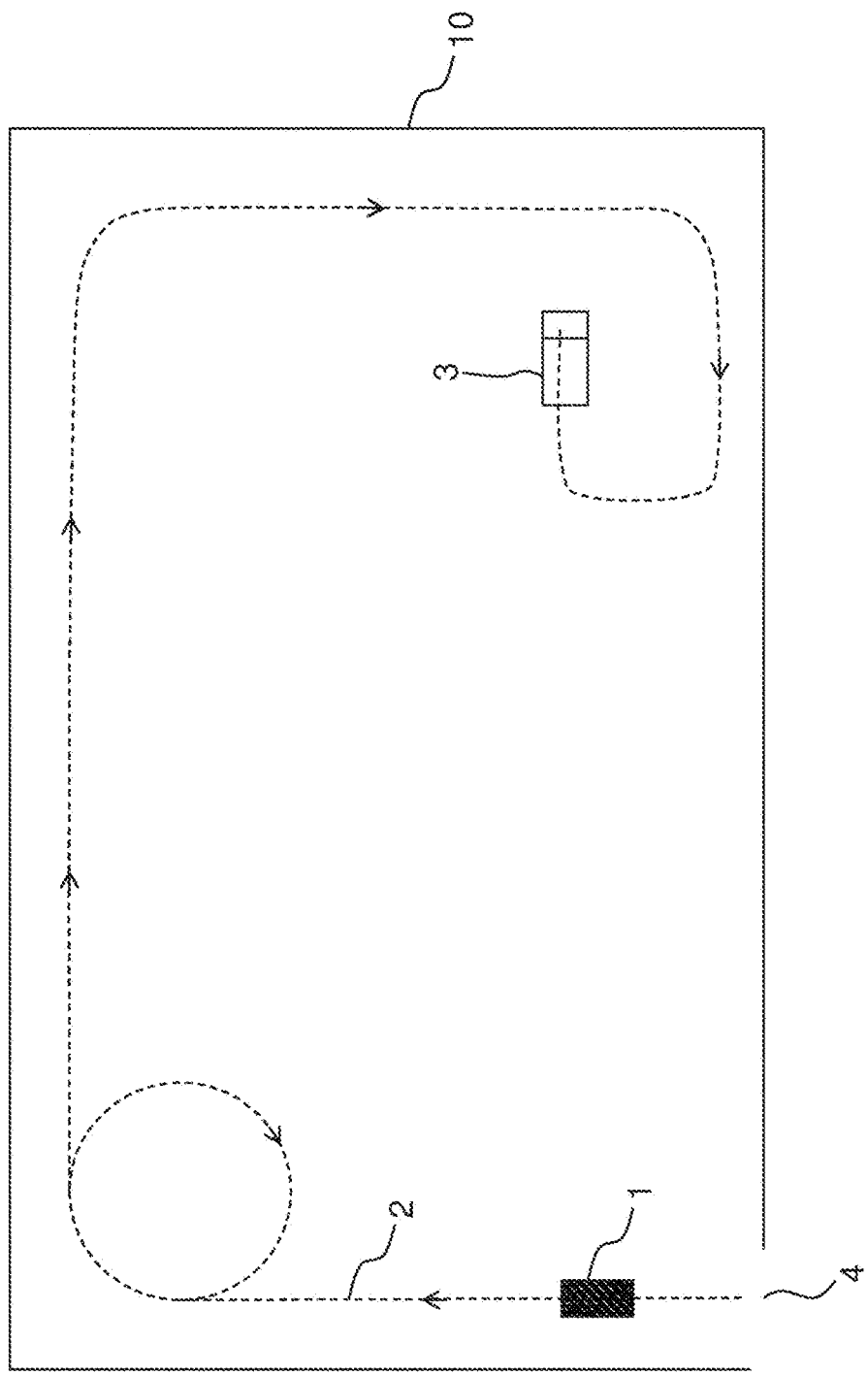
FIG. 1, an illustration of the issue of the guiding of a bus inside a storage centre, as an example of application of the invention.

FIG. 1 illustrates the issue of the guiding of a bus 1 in a storage centre 10. The path that the bus must follow, from the entrance of the centre, to reach its parking space 3, is represented by a broken line 2. In this example, the bus must follow several bends with tight radius of curvature in a reduced space, in particular a spiral climb or descent to go from one floor to another and the successive turns leading to the parking space. The reverse path is travelled to the exit of the centre which corresponds also, in this example, to the entrance 4.

Figure 2:
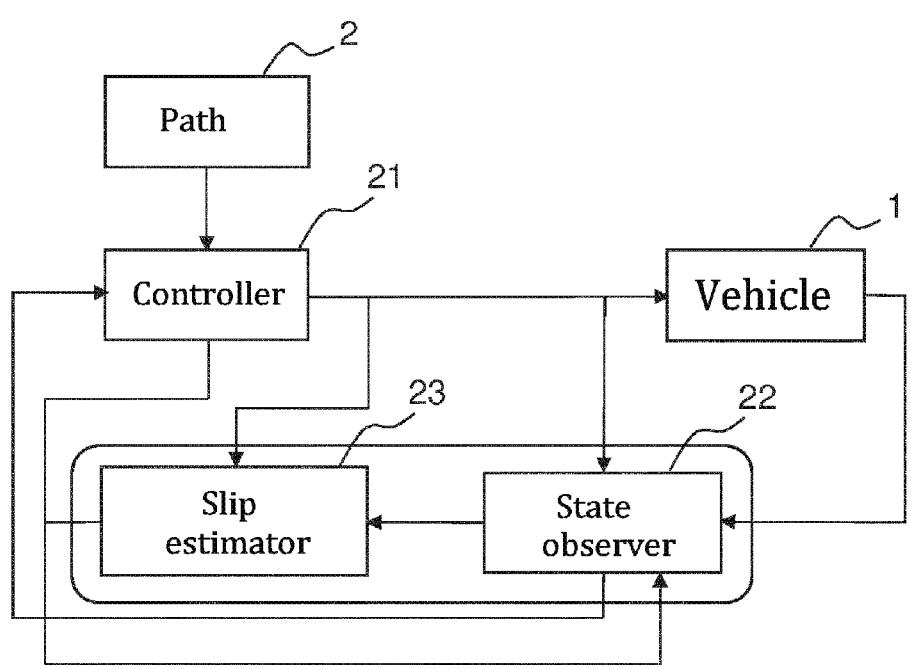
FIG. 2, an example of functional architecture of the control of a vehicle, used by the invention.

FIG. 2 illustrates the control architecture of the path used by the method according to the invention. This architecture comprises at least three blocks:
- a first block 21 is intended for the control itself, it comprises a controller constructed on the basis of a kinematic model of the bus 1 to be guided, this model will be described hereinbelow;
- a second block 22 formed by a slip observer based on a kinematic or dynamic horizontal 2D model, correcting the slip values taken into account in the control model;
- the third block 23 estimates the slips from the observations supplied by the observer 22.

This control architecture is the same as that described in the patent application FR 1501414. In particular, the state observer 22 and the slip estimator 23 are the same. The kinematic model, described hereinbelow, is simplified compared to that of the document FR 1501414.

A control device according to the invention therefore incorporates these three block 21, 22, 23, these blocks being functions performed by a computer implementing the different phases of the method according to the invention.

The control device, fixed to the bus, is linked via appropriate interfaces to:
- an energy source ensuring its electrical power supply;
- a perception system which gives information on position and orientation relative to an accommodation station, this system being notably described in the patent application FR 1455049, the accommodation station being, for example, the parking space 3 of FIG. 1;
- motors for actuating the steering and traction of the bus that the controller controls in terms of steering lock angle and linear traction speed;
- proprioceptive sensors of the vehicle: coders measuring the angle of the front and rear steering axles, coders measuring the speed of the front and rear wheel axles and a distance sensor indicating the vertical position of the vehicle, this position being, for example, indicated by the measurement of distance between a support and the ground.

Hereinbelow, the different kinematic models used for the control 21 and the observation 22 are described. The control algorithm is based on a linearized model.

Figure 3:
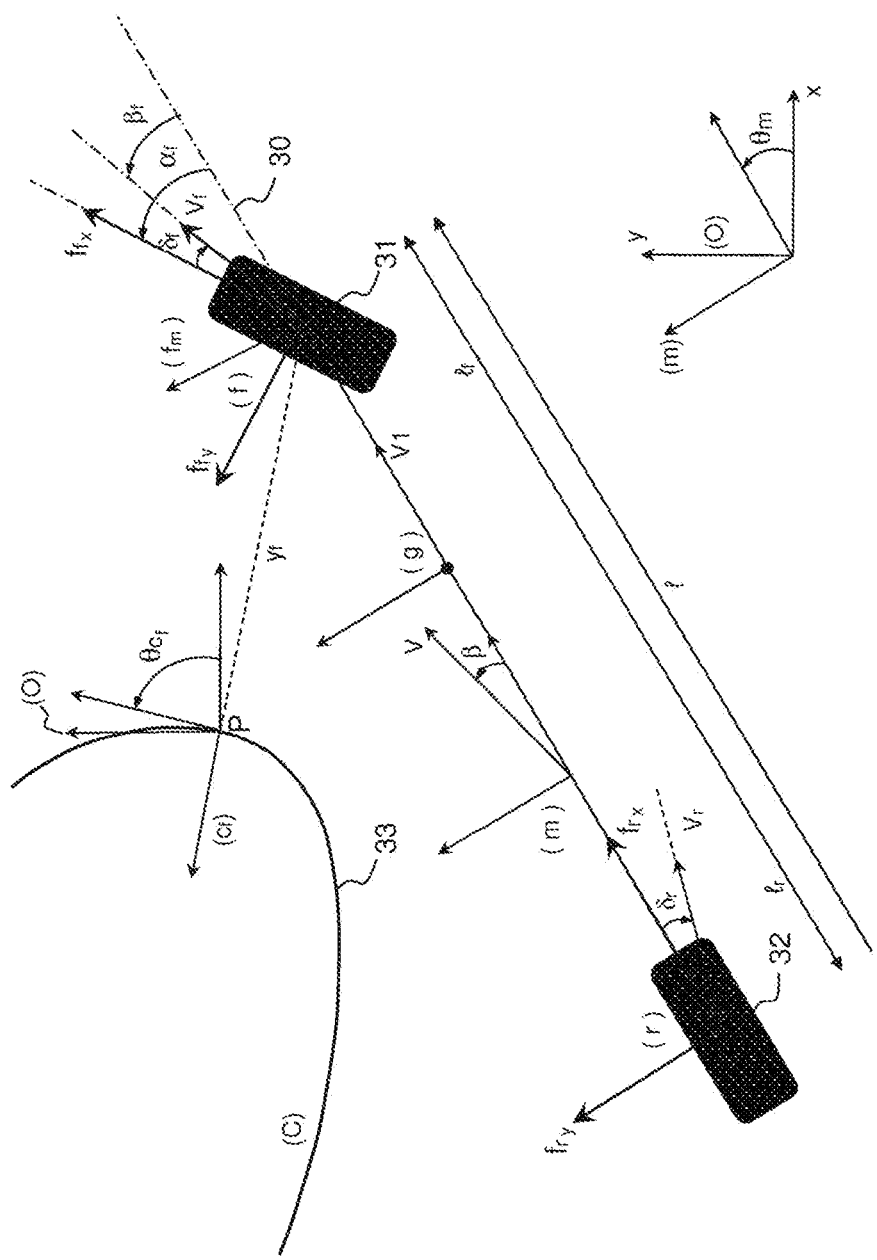
FIG. 3, an example of kinematic model used by the invention.

FIG. 3 presents the 2D kinematic model of the bus mentioned previously, with respect to a path 33 constructed as a function of a predictive model and of the current position of the bus. This kinematic model is similar to that described in the document A. Micaelli and C. Samson, "Trajectory tracking for unicycle-type and two-steering-wheels mobile robots" and suited to the situation of FIG. 3.

For simplification purposes, a single front wheel 31 represents both of the two front wheels and their axis (axle). Likewise, a single rear wheel 32 represents both of the two rear wheels and their axis (axle). A local reference frame (f) is linked to the front wheels and a local reference frame (r) is linked to the rear wheels.

For reasons of clarity, the centre of the local reference frame (f) has not been represented on the path 33, at the current point P. The same applies for the reference frame (r).

The front wheels 31 have a speed vector $V_f$ forming an angle $\delta_f$ relative to the steering axis of the wheels. This angle $\delta_f$ represents the slip of the wheels on the ground. The speed vector $V_f$ forms an angle $\beta_f$ with the axis 30 of the bus, equal to the corrected steering angle $\alpha_f$ of the slip angle $\delta_f$. The guiding of the bus is performed by the front wheels, according to the steering angle $\alpha_f$. The angle $\beta_f$ expresses the steering lock angle of the front wheels.

In the case of the rear wheels 32, the steering angle $\alpha_r$ is nil. There is always a slip angle $\delta_r$, between the speed vector of the rear wheels $V_r$ and the steering axis 30.

The resultant speed vector V of the bus forms an angle $\beta$ relative to the axis 30 of the bus. This angle $\beta$ expresses the resultant slip of the vehicle, in the absence of slip $\beta=0$.

The line of the axis 30 of the vehicle is marked in an absolute reference frame (o) by an angle $\theta_m$. This angle $\theta_m$ also represents the angle between the mobile reference frame (m) linked to the vehicle and the absolute reference frame (o).

The centre of the axle of the front wheels 31 forms a deviation $y_f$, or lateral error, with the reference path 33. More specifically, through a process of constrained optimization, this deviation must be reduced for the centre of the axle of the wheels 81 to reach the path at a point P where a tangential local reference frame $c_f$ forms an angle $\theta_{Cf}$ with the mobile reference frame (o), this angle $\theta_{Cf}$ being the angle of the reference path at the point P. Likewise, the centre of the axle of the rear wheels 32 must line up with a point that is not represented of the path 33.

For the purpose of simplification, the kinematic model chosen for the synthesis of the control results from the following choice: the controlled reference frame is the reference frame (r) linked to the rear wheels 32, situated at the centre of the axle of these rear wheels. In other words, the control seeks to make this reference frame converge on the path 33.

With respect to FIG. 3, the assumption is made that the angles $\delta_f$, $\delta_r$ are small, so that they are likened to a variation of the steering angles $\alpha_f$, $\alpha_r$. Expressing the mathematical equations entails starting from the speed kinematic torque of the reference frame (f) and of the speed kinematic torque of the reference frame (r), respectively denoted $T_f$ and $T_r$:

$$T_f = \begin{bmatrix} \dot{\theta}_m + \dot{\beta}_f \\ v_f \\ 0 \end{bmatrix}, T_r = \begin{bmatrix} \dot{\theta}_m \\ v_r \\ 0 \end{bmatrix} \quad (1)$$

$\dot{\theta}_m$ being the rotation speed of the mobile, $v_f$ and $v_r$ being, respectively, the projection of the speed vectors $V_f$ and $V_r$ on the axis $f_{fx}$ of the reference frame (f) and on the axis $f_{rx}$ of the reference frame (r).

Moreover, the kinematic torques of the reference frames (f) and (r) relative to the body of the mobile and expressed in the reference frame (m) linked to the mobile, the bus in particular, are denoted $T_{f/m}$ and $T_{r/m}$ and thus formulated:

$$T_{f/m} = \begin{bmatrix} \dot{\beta}_f \\ 0 \\ 0 \end{bmatrix}, T_{r/m} = \begin{bmatrix} 0 \\ 0 \\ 0 \end{bmatrix} \quad (2)$$

The torques defined by the relationship (1) are not independent. The combination of the relationships (1) and (2) makes it possible to link $v_f$ and $v_r$ and obtain an expression of the rotation speed $\dot{\theta}_m$ of the mobile, i.e.:

$$T_m = {}^m Ad_f(T_f - T_{f/m}) = {}^m Ad_r T_r \quad (3)$$

with:

$${}^m Ad_{f,r} = \begin{bmatrix} 1 & 0_{1\times 2} \\ -{}^m t_{\perp,f,r} & {}^m R_{f,r} \end{bmatrix};$$

${}^m t_{f,r}$, respectively represents the vectors mf and mr expressed in the reference frame (m);

${}^m t_{\perp f,r}$ is the vector obtained by rotation of $\pi/2$ of the vector ${}^m t_{f,r}$;

${}^m R_{f,r}$ is a rotation matrix expressing, respectively, the orientation of the reference frames (f) and (r) in the reference frame (m).

Thus:

$${}^m Ad_f = \begin{bmatrix} 1 & 0 & 0 \\ 0 & \cos\beta_f & -\sin\beta_f \\ -l_f & \sin\beta_f & \cos\beta_f \end{bmatrix};$$

$${}^m Ad_r = \begin{bmatrix} 1 & 0 & 0 \\ 0 & 1 & 0 \\ -l_r & 0 & 1 \end{bmatrix}$$

hence:

$$T_m = \begin{bmatrix} \dot{\theta}_m \\ v_f \cos\beta_f \\ -l_f \dot{\theta}_m + v_f \min\beta_f \end{bmatrix} = \begin{bmatrix} \dot{\theta}_m \\ c_r \\ -l_r \dot{\theta}_m \end{bmatrix}$$

leading to the rotation speed according to the following relationship:

$$\begin{cases} \dot{\theta}_m = \frac{\sin\beta_f}{l_f - l_r} v_f = \frac{\tan\beta_f}{l_f - l_r} v_r \\ v_r = v_f \cos\beta_f \end{cases}$$

After the equations of evolution of the model, the path continuation is dealt with below.

For each of the reference frames (f) and (r), the projection onto the path and the associated reference frame, respectively the reference frame $(c_f)$ and the reference frame $(c_r)$, which is not represented, are considered. Relative to these reference frames, the evolution of reference frame (f) and of the reference frame (r) is given by:

$$^fT_{f/c_f} = T_f - {}^fAd_{c_f}T_{c_f}, \; {}^rT_{r/c_r} = T_r - {}^rAd_{c_r}T_{c_r} \quad (4)$$

with:

$$^{f,r}Ad_{c_{f,r}} = \begin{bmatrix} 1 & 0_{1\times 2} \\ -^{f,r}t_{\perp c_{f,r}} & {}^{f,r}R_{c_{f,r}} \end{bmatrix};$$

$$^{f,r}t_{c_{f,r}} = -^{f,r}R_{c_{f,r}} \begin{bmatrix} 0 \\ c_{f,r}y_{f,r} \end{bmatrix};$$

$$^{f,r}R_{c_{f,r}} = \begin{bmatrix} \cos(\theta_m - \theta_{c_{f,r}} + \beta_{f,r}) & \sin(\theta_m - \theta_{c_{f,r}} + \beta_{f,r}) \\ -\sin(\theta_m - \theta_{c_{f,r}} + \beta_{f,r}) & \cos(\theta_m - \theta_{c_{f,r}} + \beta_{f,r}) \end{bmatrix};$$

$$T_{c_{f,r}} = \begin{bmatrix} c_{f,r}\dot{s}_{f,r} \\ \dot{s}_{f,r} \\ 0 \end{bmatrix},$$

with $s_{f,r}$ and $c_{f,r}$ curvilinear abscissas and curvatures associated with the path in $(c_f)$ and $(c_r)$ respectively.

In particular, at the level of the axle of the front wheels:

$$^ft_{c_f} = {}^fR_{c_f}\begin{bmatrix} 0 \\ -^{c_f}y_f \end{bmatrix} = \begin{bmatrix} ^{c_f}y_f\sin(\theta_{cf} - \theta_f) \\ -^{c_f}y_f\cos(\theta_{cf} - \theta_f) \end{bmatrix} \text{ and}$$

$$-J^ft_{c_f} = \begin{bmatrix} -^{c_f}y_f\cos(\theta_{cf} - \theta_f) \\ -^{c_f}y_f\sin(\theta_{cf} - \theta_f) \end{bmatrix}, \text{ with } \theta_f = \theta_m + \beta_f.$$

Hence:

$$^fAd_{c_f} = \begin{bmatrix} 1 & 0 & 0 \\ -^{c_f}y_f\cos(\theta_{cf} - \theta_f) & \cos(\theta_{cf} - \theta_f) & -\sin(\theta_{cf} - \theta_f) \\ -^{c_f}y_f\sin(\theta_{cf} - \theta_f) & \sin(\theta_{cf} - \theta_f) & \cos(\theta_{cf} - \theta_f) \end{bmatrix}$$

Thus:

$$^fT_{f/c_f} = \begin{bmatrix} \dot{\theta}_m - c_f\dot{s}_f + \dot{\beta}_f \\ v_f + y_f\cos(\theta_{cf} - \theta_f)c_f\dot{s}_f - \cos(\theta_{cf} - \theta_f)\dot{s}_f \\ 0 + y_f\sin(\theta_{cf} - \theta_f)c_f\dot{s}_f - \sin(\theta_{cf} - \theta_f)\dot{s}_f \end{bmatrix}$$

Now $^{c_f}T_{f/c_r} {}^{c_f}Ad_f{}^fT_{f/c_f}$
Therefore:

$$^fR_{c_f}^t J^ft_{c_f} = \begin{bmatrix} -\cos(\theta_{cf} - \theta_f) & -\sin(\theta_{cf} - \theta_f) \\ \sin(\theta_{cf} - \theta_f) & -\cos(\theta_{cf} - \theta_f) \end{bmatrix}$$

$$\begin{bmatrix} ^{c_f}y_f\cos(\theta_{cf} - \theta_f) \\ ^{c_f}y_f\sin(\theta_{cf} - \theta_f) \end{bmatrix} = \begin{bmatrix} -^{c_f}y_f \\ 0 \end{bmatrix};$$

and therefore:

$$^{c_f}Ad_f = {}^fAd_{c_f}^{-1} = \begin{bmatrix} 1 & 0 & 0 \\ -^{c_f}y_f & \cos(\theta_{cf} - \theta_f) & \sin(\theta_{cf} - \theta_f) \\ 0 & -\sin(\theta_{cf} - \theta_f) & \cos(\theta_{cf} - \theta_f) \end{bmatrix}.$$

In other words, in the reference frame $(c_f)$:
$\dot{\theta}_{f/c_f} = \dot{\theta}_m - c_f\dot{s}_f | \dot{\beta}_f; \dot{x}_{f/c_f} = v_f\cos(\theta_{c_f} - \theta_f)) - \dot{s}_f - {}^{c_f}y_f(\dot{\theta}_m \cdot \dot{\beta}_f - 2c_f\dot{s}_f)$.
Hence: $\dot{x}_{f/c_f} v_f\cos(\theta_{c_f} - \theta_f) - \dot{s}_f(1 - c_f{}^{c_f}y_f) - {}^{c_f}y_f\dot{\theta}_{f/c_f}$
And: $\dot{y}_{f/c}{}^f - r_f\sin(\theta_{c_f} - \theta_f)$.

By writing the relative speed $^fT_{f/c_f}$ in the reference frame $(c_f)$ without transport, that is to say by multiplying the translation speed by the matrix $^fR_{c_f}^t$, the following is obtained:

$$\begin{cases} \dot{\theta}_{f/c_f} = \frac{\sin\beta_f}{l}v_f + \dot{\beta}_f - c_f\dot{s}_f \\ 0 = v_f\cos(\theta_f - \theta_{c_f}) - \dot{s}_f(1 - c_f{}^{c_f}y_f) \\ \dot{y}_{f/c_f} = v_f\sin(\theta_f - \theta_{c_f}) \end{cases} \quad (5)$$

Similarly, $^fT_{f/c_r}$ is expressed in the reference frame $(c_r)$:

$$\begin{cases} \dot{\theta}_{r/c_r} = \frac{\tan\beta_f}{l}v_r - c_r\dot{s}_r \\ 0 = v_r\cos(\theta_r - \theta_{c_r}) - \dot{s}_r(1 - c_r{}^{c_r}y_r) \\ \dot{y}_{r/c_r} = v_r\sin(\theta_r - \theta_{c_r}) \end{cases} \quad (6)$$

The linear model is described hereinbelow.

The navigation path considered is a circle of constant curvature $C_r$. The models above are then linearized around the state of equilibrium:

$\theta_r = \theta_{c_r}$;

$y_r/c_r = 0$;

$\tan\beta_f = lc_r = \tan\beta_c$.

By considering the law of breakdown of a function into Taylor series:

$$f(x) = \sum_i \frac{f^{(i)}(x_0)}{i!}(x-x_0)^i$$

the following applies for the tangent function:

$$\tan(x) \approx \tan\beta_c + (1+\tan^2\beta_c)(x-\beta_c) + \tan\beta_c(1+\tan^2\beta_c)(x-\beta_c)^2$$

It follows therefrom that, by positing:
$\theta = \theta_r - \theta_{c_r}$;
$v = v_r$;
$y = y_r / c_r$.
the linearization of the relationships (6) leads to the following relationships:

$$\dot{s}_r = \frac{v\cos\theta}{1-c_r y} \approx \frac{v}{1-c_r y};$$

$$\dot{y} = v\sin\theta \approx v\theta = (1-c_r y)\dot{s}_r \theta;$$

$$\dot\theta = [lc_r + (1+l^2 c_r^2)(\beta_f - \beta_c)]\frac{v}{l} - c_r \dot{s}_r;$$

$$\dot\theta = [lc_r + (1+l^2 c_r^2)(\beta_f - \beta_c)]\frac{(1-c_r y)\dot{s}_r}{l} - c_r \dot{s}_r.$$

Then, by considering $$y' = \frac{dy}{ds} = \frac{dy}{dt}\frac{dt}{ds} = \frac{\dot y}{\dot s}$$

and by eliminating the terms that are two times smaller like $y(\beta_f - \beta_c)$, the kinematic model is obtained that is defined by the set of the following relationships:

$$\begin{cases} \theta' = \frac{(1+l^2 c_r^2)}{l}(\beta_f - \beta_c) - c_r^2 y \\ y' = \theta \\ y'' = \theta' \\ y''' = \frac{(1+l^2 c_r^2)}{l}\beta'_f - c_r^2 y' \end{cases} \quad (7)$$

in which:
- (.)', (.)'', (.)''' respectively express the first, second and third derivatives relative to the curvilinear abscissa, $\theta'$ being the first derivative of $\theta$, and y', y'', y''' being respectively the first, second and third derivatives of y;
- $\theta = \theta_r - \theta_{c_r}$ is the angular error (in radians) which corresponds to the orientation of the vehicle relative to the tangent at the reference point of the path to be followed;
- $y = y_{r/c_r}$ is the lateral error (m) which corresponds to the projection of the centre of the rear wheel of the vehicle to the reference point of the path to be followed;
- l is the wheelbase of the vehicle;
- $c_r$ is the curvature of the path to be followed;
- $\beta_f$ is the real steering angle of the front axle of the vehicle, taking into account the slip $\delta_f$;
- $\beta_c$ is the desired steering angle of the front axle of the vehicle to follow a path of curvature $c_r$.

By considering the state vectors:

$$y = \begin{bmatrix} y \\ y' \\ y'' \end{bmatrix}$$

in which the exponent "'" expresses a derivation relative to the curvilinear abscissa as explained above; and $$x = \begin{bmatrix} y \\ \theta \\ \beta_f - \beta_c \end{bmatrix}$$

the following linearized model is obtained:

$$\begin{cases} y = \begin{bmatrix} 1 & 0 & 0 \\ 0 & 1 & 0 \\ -c_r^2 & 0 & \frac{1+l^2 c_r^2}{l} \end{bmatrix} x = Px \\ y' = \begin{bmatrix} 0 & 1 & 0 \\ 0 & 0 & 1 \\ 0 & -c_r^2 & 0 \end{bmatrix} + y + \begin{bmatrix} 0 \\ 0 \\ \frac{1+l^2 c_r^2}{l} \end{bmatrix} \beta'_f = AP^{-1}y + Bu \end{cases} \quad (8)$$

In order to take account of the strong constraints of accessibility during the navigation in a bus centre, the method according to the invention uses a predictive control. This is a discrete predictive control which relies on the discrete model associated with the relationships (8). This predictive control optimizes a criterion that is a function of the predicted states and of the future controls over a spatial window of length $n_{step}S$ by guaranteeing if possible a certain number of constraints on the state (an admissible template) and the control (speed of orientation of the steering gear constraints).

Given (8), the state matrices of the continuous system are:

$$A_c = AP^{-1} \text{ and } B_c = B$$

The solution of the differential equation $y' = A_c y + B_c u$ is $y(s) = y_0 e^{A_c s} + \int_0^S e^{A_c(s-\tau)} B_c u(\tau) d\tau$.

For that, $A_c$ and $B_c$ are assumed constant relative to the curvilinear abscissa s.

This assumption is retained over each small interval of distance S, the matrices $A_{ck}$ and $B_{ck}$ being a function of the curvilinear abscissa $c_{rk}$ and constant over a pitch S.

By performing a discretization along the curvilinear abscissa according to the pitch S, the state matrices of the discrete system:

$Y_{k+1} = A_{dk} y_k + B_{dk} u_k$ (k being between 1 and N, where N is the number of intervals) are given by:

$$\begin{cases} A_{d_k} = e^{A_{c_k} S} = I_S + SA_{c_k} + \frac{S}{2}A_{c_k}^2 + \ldots + \frac{S^i}{i!}A_{c_k}^i + \ldots \\ B_{d_k} = e^{A_{c_k} S}\int_0^S e^{-A_{c_k}\tau}d\tau B_{c_k} = e^{A_{c_k} S}\frac{(e^{-A_{c_k} S} - I_3)}{-A_{c_k}}B_{c_k} = \frac{B_{c_k}}{A_{c_k}}(A_{d_c} - I_3) \end{cases} \quad (9)$$

The input $u_k$ is assumed constant over the distance pitches S. If forward and reverse movements are considered, the calculations must be performed for $S>0$ and $S<0$.

After this discretization step, predicted states are calculated. The predicted states are calculated by starting from the knowledge of the current state $y_0$ and by using the matrices $A_{dk}$ and $B_{dk}$ calculated previously. By performing a recurrence over n pitches, the following is obtained:

$$\begin{cases} y_1 = A_{d_0} y_0 + B_{d_0} u_0 \\ y_2 = A_{d_1} A_{d_0} y_0 + A_{d_1} B_{d_0} u_0 + B_{d_1} u_1 \\ y_3 = A_{d_2} A_{d_1} A_{d_0} y_0 + A_{d_2} A_{d_1} B_{d_0} u_0 + A_{d_2} B_{d_1} u_1 + B_{d_2} u_2 \\ \text{etc.} \end{cases}$$

In other words, in matrix form:

$$\begin{bmatrix} y_1 \\ y_2 \\ \vdots \\ y_n \end{bmatrix} = \begin{bmatrix} A_{d_0} \\ A_{d_1} A_{d_0} \\ \vdots \\ A_{d_{n-1}} \ldots A_{d_0} \end{bmatrix} y_0 + \qquad (10)$$

$$\begin{bmatrix} B_{d_0} & 0_{3\times 1} & \ldots & 0_{3\times 1} \\ A_{d_1} B_{d_0} & B_{d_1} & \ddots & \vdots \\ \vdots & \vdots & \ddots & 0_{3\times 1} \\ A_{d_{n-1}} \ldots A_{d_1} B_{d_0} & A_{d_{n-1}} \ldots A_{d_2} B_{d_1} & \ldots & B_{d_{n-1}} \end{bmatrix} \begin{bmatrix} u_0 \\ u_1 \\ \vdots \\ u_{n-1} \end{bmatrix}$$

and, more synthetically, the predicted state Y is obtained as a function of the current state $y_0$ and of the future control U, i.e.:

$$Y = A y_0 + \beta U \qquad (11)$$

The criterion to be optimized is a quadratic function of the predicted state Y and of the future control U. According to the invention, this criterion, denoted crit, is expressed as follows:

$$\text{crit} = 1/2 Y^t \mathcal{Q} Y + 1/2 U^t \mathcal{R} U \qquad (12)$$

in which $\mathcal{Q}$ and $\mathcal{R}$ are matrices of 3n×3n and n×n dimensions respectively for the state and for the control. They are chosen to be of block-diagonal structure of generic elements $\gamma_Q^k Q_{3\times 3}$ and $\gamma_R^k R_{1\times 1}$, in which $\gamma_Q^k$ and $\gamma_R^k$, lying between 0 and 1, are omission factors, k being the rank in the diagonal and the matrices Q and R being adjustment matrices defined as positive.

The expression of the criterion, solely as a function of the independent unknowns, that is to say as a function of U takes the form:

$$\text{crit} = 1/2 U^t (\mathcal{B}^t{}^t \mathcal{Q} \mathcal{B} + \mathcal{R}) U + y_0 \mathcal{A}^t \mathcal{Q} \mathcal{B} U \qquad (13)$$

from which the constant dependent only on $y_0$ is extracted.

The expression of the constraints on the state for an a priori given template is given below. These constraints are a function of the environment in which the guided bus is moving around, for example the structure of a storage centre, and on the dimensions of the bus. Simplistically, firstly, the bus is likened to a rectangle whose front and rear ends are respectively situated at a point Df and at a point Dr of the steering axis of the front gear along the longitudinal axis 30. It is posited as constraint that these ends remain within a tolerance $\delta_{gap}$ around the path. This constraint can be written thus:

$$|y - D_r \sin(\theta_m - \theta_c)| < \delta_{gap}$$

$$|y - D_r \sin(\theta_m - \theta_c)| < \delta_{gap}$$

These relationships can also be expressed as follows, by linearizing and by positing $\theta = \theta_m - \theta_c$:

$$-\begin{bmatrix} \delta_{gap} \\ \delta_{gap} \end{bmatrix} \leq \begin{bmatrix} 1 & -D_r & 0 \\ 1 & D_f & 0 \end{bmatrix} x \leq \begin{bmatrix} \delta_{gap} \\ \delta_{gap} \end{bmatrix} \qquad (14)$$

By positing:

$$D = \begin{bmatrix} 1 & -D_r & 0 \\ 1 & D_f & 0 \\ -1 & D_c & 0 \\ -1 & -D_f & 0 \end{bmatrix} P^{-1}$$

and by positing $d = \delta_{gap} 1_{4\times 1}$;
the constraint can be expressed by the following relationship:

$$Dy + d \geq 0_{4\times 1} \qquad (15)$$

Extended to any predicted state and expressed as a function of the future controls, this constraint becomes:

$$\mathcal{D} \mathcal{B} + \sigma_{gap} + \mathcal{A}^t y_0 \geq 0_{4n\times 1} \qquad (16)$$

with:
$\mathcal{D}$, the block diagonal matrix formed by n blocks D; and $\sigma_{gap} = \delta_{gap} 1_{4n\times 1}$.

The control vector U is obtained by solving the following quadratic equation:

$$\begin{cases} \min_U \frac{1}{2} U^t (\mathcal{B}^t \mathcal{Q} \mathcal{B} + \mathcal{R}) U + y_0 \mathcal{A}^t \mathcal{Q} \mathcal{B} U \\ \mathcal{D} \mathcal{B} U + \delta_{gap} + \mathcal{A} y_0 \geq 0_{4n\times 1} \end{cases} \qquad (17)$$

The first element $\beta'_f = u_0$ of the vector U is then extracted. The control is then given by the steering lock angle of the front wheels: $\beta_f = v_f u_0$.

The phases of implementation of the method according to the invention which apply for example the path and control prediction described previously are now described. The steps of the patent application FR 1501414 are repeated but differently, in particular the path is no longer subdivided according to rectilinear sections but according to sections of non-zero curvature, by advantageously using a hypothetical curvature as a function of the real curvature of the path to be followed, in order to implement the control with a curvature of progressive variation, as will be described hereinbelow.

The method according to the invention thus comprises the phases described hereinbelow. These phase are repeated throughout the trajectory as a function of the result of the prediction.

In a first phase, the path 33 to be followed to engage the bus to its parking space 3 is generated, as a function of the state of the vehicle and of this parking space which is the target position. If the example of FIG. 1 is considered, the path begins at the entrance 4 of the storage centre. The method according to the invention applies also for the extraction of the bus from its parking space to drive it to the entrance 4 of the storage centre. In this case, the target position is for example this entrance 4. The state of the bus as a function of which the path is generated is the current position of the bus and its orientation (defined by the orientation of the axis 30 of the bus). The path is subdivided into sections.

In a second phase, for each intermediate position of the bus (corresponding to a start of section), a non-zero hypothetical curvature is defined for a set of n subsequent sections, forming the horizon over which the prediction is performed. The curvature varies progressively from one section to the next. Examples of definition of curvatures will be given hereinbelow.

Then, before the bus engages a movement, a prediction is made at the start of each section as to whether the path can be followed as a function on the one hand of the bulk constraints (for example those encountered on the trajectory inside the storage centre) or of the imposed speed limitation constraints on the actuators of the wheels and, on the other hand, of the estimated lateral and/or longitudinal slips.

In a third phase, if the prediction indicates that the path can be followed, the steering lock angle of the front wheels 31 and the linear traction speed of the bus are controlled as a function of the state of the bus and of the lateral and/or longitudinal slips, to line up the centre of the axle of the rear wheels 32 on the path 33. The control applied is for example that described previously in relation to the kinematic model retained for the bus.

The second and third phases are repeated as long as the path can be followed. If the result of the prediction is that the path cannot be followed, the bus is realigned to the target position and a new path is generated according to the first phase.

In this trajectory along the path 33, the bus can perform its forward or reverse movement.

The nature of the path sections on which the prediction is performed is now described.

When the kinematic model of the bus is linearized around a section of curvature $c_r$, a nominal front steering angle $\beta_f$ configured for the corresponding curvature is a priori assumed. There is, consequently, a jump in steering angle in the prediction. If this jump is too great, it is not feasible in a real situation.

According to the invention, one solution to this problem is to artificially modify the value of the curvature $c_r$ over all the prediction horizon n, so as to obtain a progressive variation at the change of section. The number n indicates the number of sections to be covered over the prediction horizon.

With the bus being at the current instant at the start of a section of curvature $c_{r_0}$ and having to reach, at its horizon n, a section of curvature $c_{r_{n-1}}$, at all the intermediate positions, the curvature $c_{r_i}$ is defined by one of the following polynomials:

in which $1 \leq i \leq n-2$ $$c_{r_i} = \frac{2c_{r_0} + c_{r_{n-1}}}{3},$$

this first polynomial being a first effective approximation, in order to anticipate a third of the curvature at the end of the prediction horizon;

$$c_{r_i} = \frac{2c_{r_{n-1}} + c_{r_0}}{n-1} i + c_{r_0},$$

this second polynomial allowing a linear progression between $c_{r_0}$ and $c_{r_{n-1}}$.

The intermediate positions defined hereinbelow correspond to the starts of the successive sections of the path.

Other choices are possible, notably more complex polynomials of higher degrees. According to the cases, the ratio between the value of the prediction horizon nS and the size of the sections of the path needs to be considered. Indeed, in the case where the prediction horizon nS is small compared to the size of the sections, this method ensuring a redefinition of each of the intermediate curvatures $c_{r_i}$ is the most relevant, inasmuch as it is comparable to a virtual subdivision of the latter. On the other hand, in the case where the prediction horizon nS becomes significant compared to the size of the sections, a virtual variation of the curvature values is not always necessary. If, however, such a variation is necessary, it is essential to ensure that any new virtual curvature value does not compromise the path, by still remaining within the real value and the next different real value.

Regarding the characterization of the path, the latter is defined at least in a geometrical form x(u) parameterized by a parameter u.

It is assumed that the function x(.) is $C^3$ piecewise. This expression makes it possible to deduce all the desired characteristics of the path, in terms of tangent, normal, curvature and variation of curvature, i.e.:

$$\begin{cases} t_x = \frac{x'_u}{\|x'_u\|} \\ n_x = t_{\perp x} \\ c_x = \frac{\det(x'_u, x''_u)}{\|x'_u\|^2} \\ g_x = \frac{\det(x'_u, x'''_u)\|x'_u\|^2 - 3(x''_u{}^t x''_u)x''_u)}{\|x'_u\|^6} \end{cases} \quad (18)$$

in which:
  $(.)'_u, (.)''_u$ et $(.)'''_u$ respectively define a first, second and third order derivation according to u;
  and $(a, b) = a^t_\perp b$.

In the case where u varies like the curvilinear abscissa s, then $\|x'_u\|=1$, and the equations (18) are simplified as:

$$\begin{cases} t_x = x'_s \\ n_x = t_{\perp s} \\ c_x = \det(x'_s, x''_s) \\ g_x = \det(x'_s, x'''_s) \end{cases} \quad (19)$$

Conventionally, the path of the bus is defined as a succession of segments and circular arcs, the position of the bus on this path varying as a function of a curvilinear abscissa s. One possible problem is that the control law put in place tends as a priority to retain a zero error over a section covered, including at the end of this section, even in the case of a strong variation of the value of the curvature on the next section. That induces errors at the moment of change of section, linked notably to the limitations of the actuators of the axles. In order to limit this phenomenon, as a function of the size of the sections and of the variation of their curvature, any pair of two successive sections having a significant variation of curvature is subdivided into several sections of smaller sizes in order to have a minimal variation of the curvature.

Among other advantages, the method according to the invention allows a bus to follow all types of paths or trajectories, with a very good accuracy on all types of section geometry, including at the transitions between the sections.

The invention has been described for driving a bus, but it can of course be applied for other types of vehicles.

The invention claimed is:

1. A method for automatically driving a vehicle from a given first point to a given second point forming a target position, said vehicle being subject to lateral and/or longitudinal slips of the front wheels and of the rear wheels in its movements, wherein it comprises at least the following phases:
a first phase wherein a path to be followed is generated as a function of the state of said vehicle and of said target position, said state being given by the current position and the orientation of said vehicle, said path being subdivided into a series of sections of which the starting point forms an intermediate position;
a second phase wherein, at the current intermediate position of said vehicle:
a curvature is defined for each of the next n sections, said curvature varying from one section to the next according to a polynomial function of the curvature $c_{r_0}$ of the section at said current position and of the curvature $c_{r_{n-1}}$ of the next $n^{th}$ section;
a prediction is made, before said vehicle engages a movement, as to whether said path can be followed over all of the next n sections, as a function of imposed constraints and of the estimated lateral and/or longitudinal slips;
a third wherein, if said path can be followed, the steering lock angle of said front wheels and the linear traction speed of said vehicle are controlled as a function of the state of said vehicle and of the lateral and/or longitudinal slips to line up the centre of the axle of said rear wheels on said path;
if the path cannot be followed, said vehicle is realigned towards said target position and a new path to be followed is generated according to the first phase.

2. The method according to claim 1, wherein at each of said intermediate positions comprised between the position of said vehicle and said $n^{th}$ section, the curvature $c_{r_i}$ is defined by:

$$c_{r_i} = \frac{2c_{r_0} + c_{r_{n-1}}}{3},$$

wherein $1 \leq i \leq n-2$.

3. The method according to claim 1, wherein at each of said intermediate positions comprised between the position of said vehicle and said $n^{th}$ section, the curvature $c_{r_i}$ is defined by:

$$c_{r_i} = \frac{2c_{r_{n-1}} + c_{r_0}}{n-1} i + c_{r_0},$$

wherein $1 \leq i \leq n-2$.

4. The method according to claim 1, wherein the law controlling said steering lock angle $\beta_f$ of the front and rear wheels is obtained according to a process of optimization of a constrained function wherein the variable is a vector u composed of the derivative relative to the distance $\beta'_f$ of said steering lock angle, independently of time.

5. The method according to claim 4, wherein said control law uses a kinematic model of said vehicle defined by the set of the following relationships:

$$\begin{cases} \theta' = \frac{(1+l^2 c_r^2)}{l}(\beta_f - \beta_c) - c_r^2 y \\ \theta \\ y'' = \theta' \\ y''' = \frac{(1+l^2 c_r^2)}{l}\beta'_f - c_r^2 y' \end{cases}$$

wherein
(.)', (.)", (.)''' respectively express the first, second and third derivatives relative to the curvilinear abscissa;
θ is the angular error (rad) which corresponds to the orientation of said vehicle relative to the tangent at the reference point of the path to be followed;
y is the lateral error which corresponds to the projection of the centre of the rear wheel of said vehicle on the reference point of the path to be followed;
l is the wheelbase of said vehicle;
$c_r$ is the curvature of the path to be followed;
$\beta_f$ is the real steering angle of the front axle of the vehicle, taking into account the slip $\delta_f$;
$\beta_c$ is the desired steering angle of the front axle of the vehicle to follow a path of curvature $c_r$.

6. The method according to claim 4, wherein a vector u is calculated for each section of said path.

7. The method according to claim 4, wherein said constraint is a function of said imposed constraints dependent on the bulk of said vehicle.

8. The method according to claim 1, wherein the state of said vehicle and the slips are derived from an observation of independent variables of said path, said variables being:
the average rotation speeds $\omega_f$ and $\omega_r$ of the front and rear wheels;
the steering angles of said front and rear wheels $\alpha_f$, $\alpha_r$;
the derivatives relative to time $\dot{\alpha}_f$, $\dot{\alpha}_r$ of said angles;
the position $(x_m, y_m)$ and the angle $(\theta_m)$ of a mobile reference frame (m) linked to said vehicle relative to a fixed reference frame (o).

9. The method according to claim 1, wherein said vehicle is a public transport bus, said bus being driven automatically inside a bus storage centre.

10. A device for controlling the automatic driving of a vehicle from a given first point to a given second point forming a target position, said vehicle being subject to lateral and/or longitudinal slips of the front wheels and of the rear wheels in its movements, wherein, said device being able to be embedded in said vehicle and to be linked at least, via appropriate interfaces, to proprioceptive sensors, exteroceptive sensors and motors actuating the steering and the traction of said vehicle, it comprises a computer implementing the method according to claim 1.

* * * * *

UNITED STATES PATENT AND TRADEMARK OFFICE
CERTIFICATE OF CORRECTION

PATENT NO. : 11,254,330 B2
APPLICATION NO. : 16/755150
DATED : February 22, 2022
INVENTOR(S) : Eric Lucet et al.

It is certified that error appears in the above-identified patent and that said Letters Patent is hereby corrected as shown below:

In the Claims

Claim 5, Column 16, Line 11:

$$\begin{cases} \theta' = \frac{(1+l^2 c_r^2)}{l}(\beta_f - \beta_c) - c_r^2 y \\ \quad \theta \\ y'' = \theta' \\ y''' = \frac{(1+l^2 c_r^2)}{l}\beta'_f - c_r^2 y' \end{cases}$$

Should be:

$$\begin{cases} \theta' = \frac{(1+l^2 c_r^2)}{l}(\beta_f - \beta_c) - c_r^2 y \\ y' = \theta \\ y'' = \theta' \\ y''' = \frac{(1+l^2 c_r^2)}{l}\beta'_f - c_r^2 y' \end{cases}$$

Signed and Sealed this
Twenty-fourth Day of May, 2022

Katherine Kelly Vidal
*Director of the United States Patent and Trademark Office*